250-203.R 56

INVENTOR.
FRANK M. GETTELFINGER
WILLIAM S. TULLOSS
BY Alden D. Redfield
Charles M. Hogan
ATTORNEYS.

INVENTOR.
FRANK M. GETTELFINGER
WILLIAM S. TULLOSS,
BY Alden D. Redfield
Charles M. Hogan
ATTORNEYS.

WAVEFORMS PRODUCED BY TARGETS OFF AXIS IN AZIMUTH ONLY

WAVEFORMS PRODUCED BY TARGET OFF AXIS IN ELEVATION ONLY

INVENTOR.
FRANK M. GETTELFINGER
WILLIAM S. TULLOSS,
BY Alden D. Redfield
Charles M. Hogan
ATTORNEYS.

WAVEFORMS PRODUCED BY TARGET OFF AXIS IN BOTH AZIMUTH AND ELEVATION

TRANSDUCER OUTPUT

792 CPS REFERENCE

TWO POSSIBLE PSD 1 OUTPUTS

INVENTOR.
FRANK M. GETTELFINGER
WILLIAM S. TULLOSS
BY Alden D. Redfield
Charles M. Hogan
ATTORNEYS.

United States Patent Office 3,413,478
Patented Nov. 26, 1968

3,413,478
BIPHASE SYSTEM WITH RETICLE MODULATING BIPHASE DATA BURSTS ON INFRARED BEAM

Frank M. Gettelfinger and William S. Tulloss, Cincinnati, Ohio, assignors to Avco Corporation, Cincinnati, Ohio, a corporation of Delaware Filed Jan. 14, 1966, Ser. No. 520,709
2 Claims. (Cl. 250—203)

ABSTRACT OF THE DISCLOSURE

This is a system for tracking targets by emitted radiant energy. An optical system impinges on an infrared detector a beam of radiation from an object within a field of vision. A reticle chops the beam, the reticle being formed to modulate on the beam biphase data bursts characterized by a signal frequency high with respect to the rate of phase reversal. A first phase reference detector in combination with spaced formation on the reticle modulates reference signals on the beam. The relative widths of the data burst outputs of the infrared detector are indicative of the elevation of the target and the positional relationships of the phase reversals to the reference signals are indicative of the azimuth of the target. A synchronized demodulator converts the data burst outputs into two-level wave forms from which target azimuth and elevation data may be derived. Synchronizing means is coupled to the demodulator. This means includes means for deriving the second harmonic of the reference signals, whereby the polarity of the two-level wave forms is ambiguous, and means for resolving that ambiguity.

Figure 1:
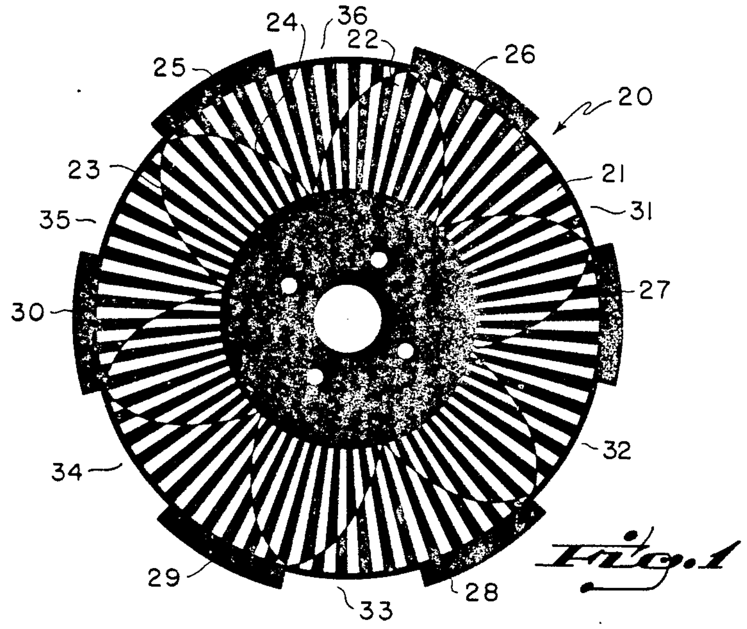

The reticle comprises a circular arrangement of angularly spaced radially extending intercepting spokes formed in alternate patterns, with the same plural number of spokes in each pattern. One of these patterns is generally lobar in form with apex directed outwardly toward the periphery. The other of said patterns is generally triangular with apex directed radially inwardly. The spokes are of the same proportions and shape but of varying lengths as defined by phase shift lines separating the patterns, whereby the spokes chop the beam of radiation alternately into waves of one phase and waves of the opposite phase.

The present invention relates to infrared tracking systems, and it provides an improved tracking system in which the reticle provides intelligence in the form of a single frequency and in which that intelligence is utilized to signify the position of a target or source of infrared energy in the field of view.

Let there be considered at this point some of the difficulties which characterize the prior art, such as the well-known Barnes Engineering tracker of the general type described in United States Patent No. 3,007,053. Such prior art devices utilize a reticle which codes the received energy in two frequencies. The reticle is a rotating wheel-like element having a circular band "formed of triangles composed of bars of different spacing." Thus the wide reticle spokes or blades are arranged in a series of triangles disposed with their bases toward the center of the reticle. Disposed between these triangles, as an alternate pattern, are triangles composed of narrower spokes or blades having their apices pointing toward the center of the reticle. The blades cause generation of a two-frequency signal. On the outer periphery of the prior art reticle there are alternate uniformly spaced opaque and transparent portions utilized in the production of a reference signal.

If a target image is centered horizontally but is displaced toward the reticle periphery vertically, the action of the reticle is to cause the production of a series of electrical bursts of different frequencies, the higher frequency signal pulses being longer in duration than the lower frequency signal pulses. When the target image is centered horizontally and displaced vertically near the reticle center, then the lower frequency pulse bursts are longer than the higher frequency burst pulses. The relative duration of the two types of pulse bursts is therefore a measure of the elevation of the target.

When a target is off axis azimuthally, then the phase of the signal bursts with respect to the reference bursts furnishes information indicative of the position of the target in azimuth. Thus it will be seen that the elevation error signal which the prior art system produces is a function of pulse width, while the azimuth error signal is a function of phase or pulse position. To give a typical example of the prior art, a constant speed reticle generates a signal which alternates between two frequencies, 720 and 2880 cycles per second, and the tracking information is signified by the frequency transition times. The two frequencies are separated by filters, the outputs of which are fed to oppositely polarized full-wave detectors. When the outputs of the two detectors are summed, a two-level envelope is developed in which level changes correspond to frequency changes in the original waveform. See the top waveform in each of FIGS. 5A, 5B, 5C, 7A, 7B, 7C, and 9A, 9B, and 9C. The elevation and azimuth error signals are derived from this envelope. It should be emphasized at this time that the present invention is also directed to the production of such a significant two-level envelope, without ambiguity, but the two levels of the envelope (FIG. 10C) produced in accordance with the invention correspond to phase changes and not frequency changes. The reasons for this improvement will now be stated.

One limitation of the prior art two-frequency system reposes in the requisite compromise in the choice of reticle blade widths from optimum frequency separation. The compromise dictates a very narrow reticle blade for developing the high frequency (2880 cycles per second) carrier. This causes severe discrimination against targets that subtend an angle greater than the blade width.

Another disadvantage of the two-frequency system is attributed to the geometry of the reticle blade design required to maintain a constant 50% transmissivity of background energy. The prior art blade utilizes an envolute pattern in each field, which produces a discontinuity in the carrier envelope after filtering. This discontinuity introduces a jitter component into the developed error signals.

A further ilimitation of the prior art two-carrier system is the introduction of noise in the elevation and azimuth error signals due to incomplete separation of the two carriers.

The principal object of the invention is to avoid the disadvantages and limitations of the prior art by providing a biphase system, including a biphase reticle, which possesses the following desired characteristics: (1) the response of the heat-seeking tracker to a non-point source or target is improved; (2) the rigorous filtering problems associated with the two-frequency system are avoided; and (3) tracker sensitivity and accuracy are materially enhanced.

Another object of the invention is to provide a two-phase tracking system together with means for processing the signal information from its transducer in such a way that the signal information controls its own decommutation or demodulation.

A further object of the invetnion is to provide means for extracting a reference signal at the carrier frequency from the biphase signal, using that reference to control the demodulation of the biphase signal, comparing the resultant with an additional reference to determine whether or not the resultant is of the desired phase, and then reversing the phase of the resultant if the answer is negative.

In accordance with one aspect of the invention, there is provided a single-frequency reticle in which the phase of the carrier is periodically reversed, in a manner analogous to that in which the two-frequency reticle caused the frequency of the carrier to change. In accordance with the invention, therefore, the phase transition provides the tracking intelligence. In a reticle per the invention a blade spacing equal to eight times that of the prior art system is used, which spacing affords an 800% improvement in sensitivity to targets subtending the same order of angle mentioned above. Additionally, as has been previously indicated, the invention provides the improvements in the over-all system which accomplishes the desired two-phase separation.

Figure 2:
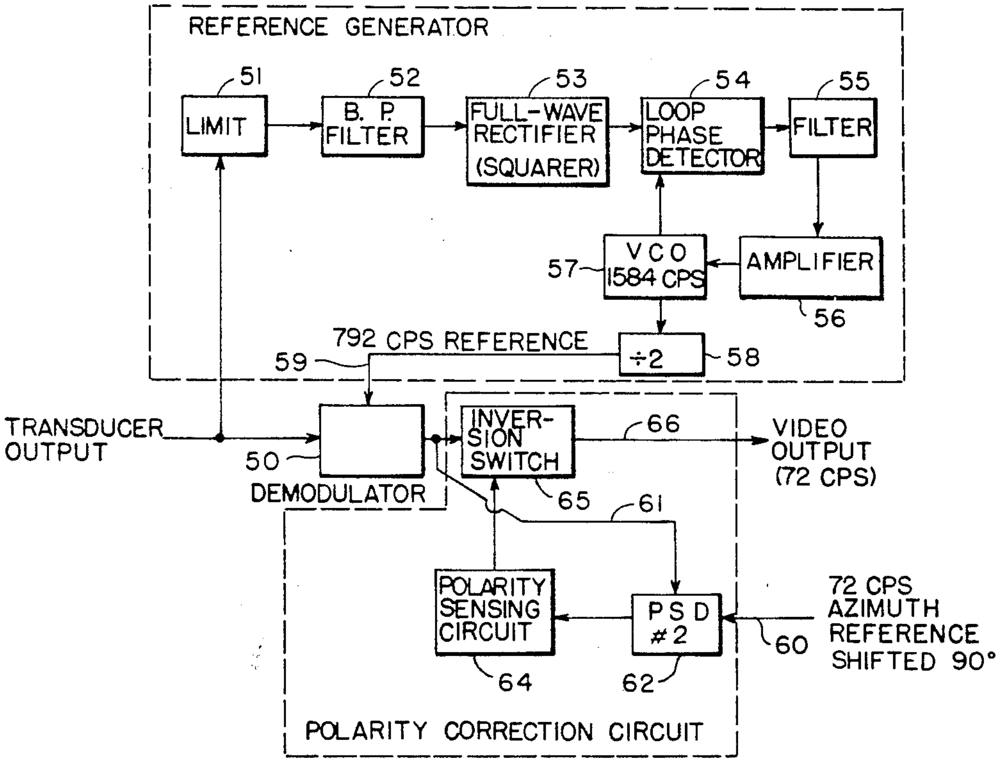
Figure 3A:
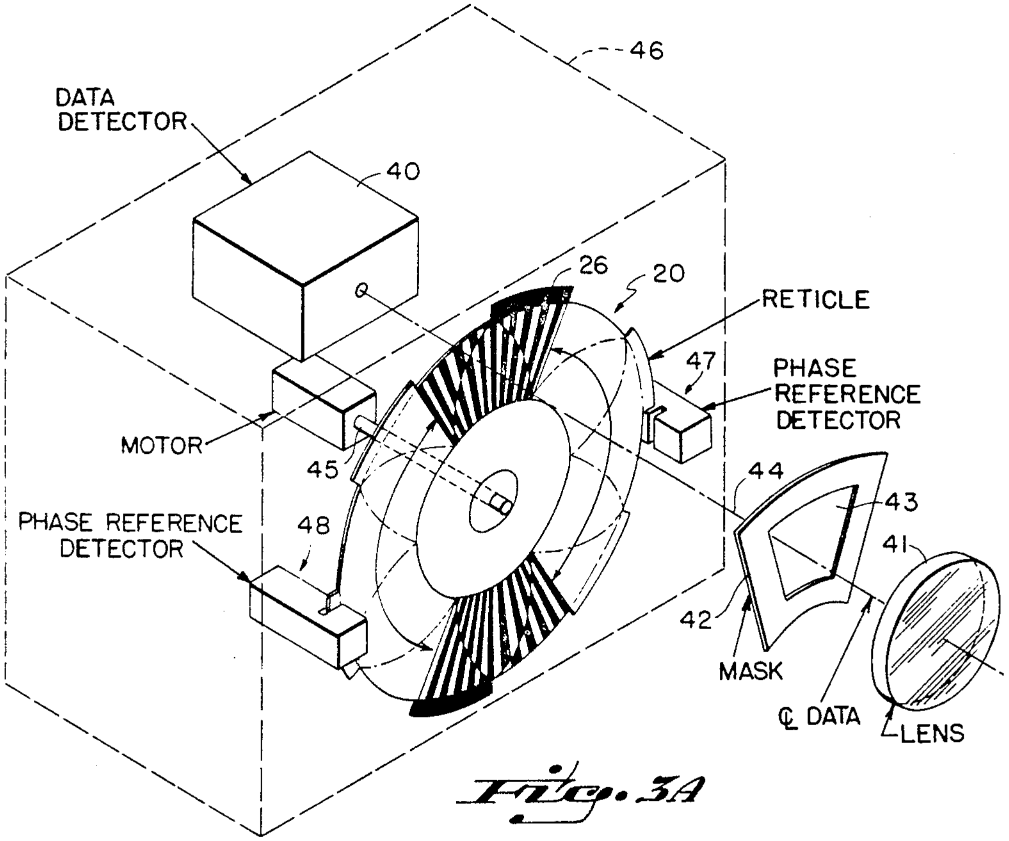
Figure 3B:
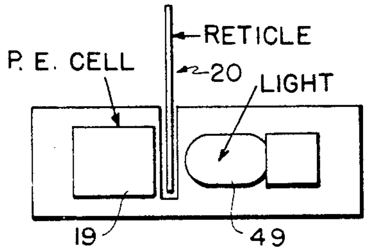
Figure 11:
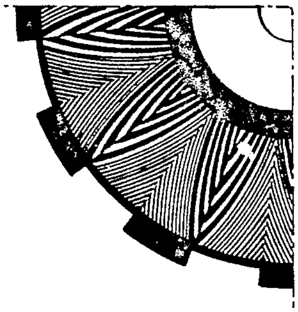
Figures 4, 5A, 5B, 5C, 5R:
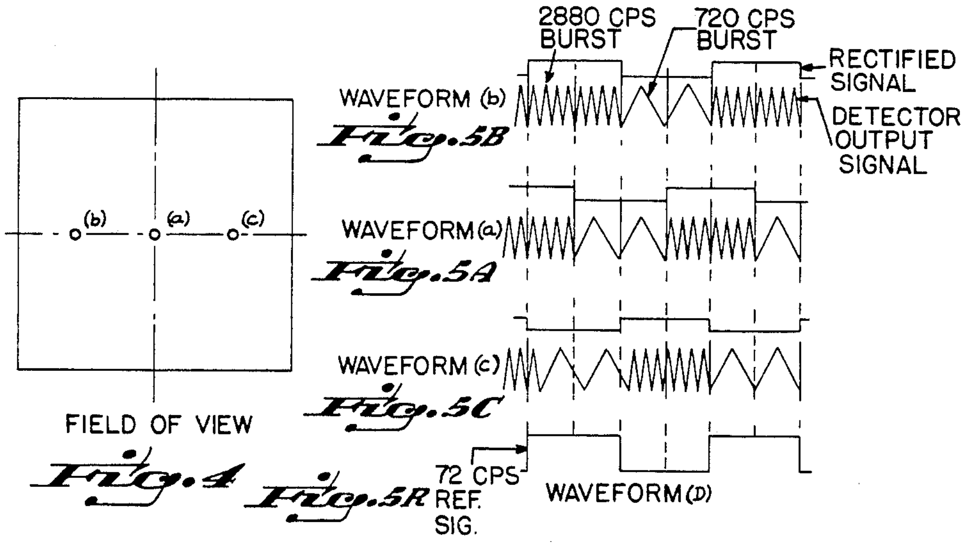
Figures 6, 7A, 7B, 7C, 7R:
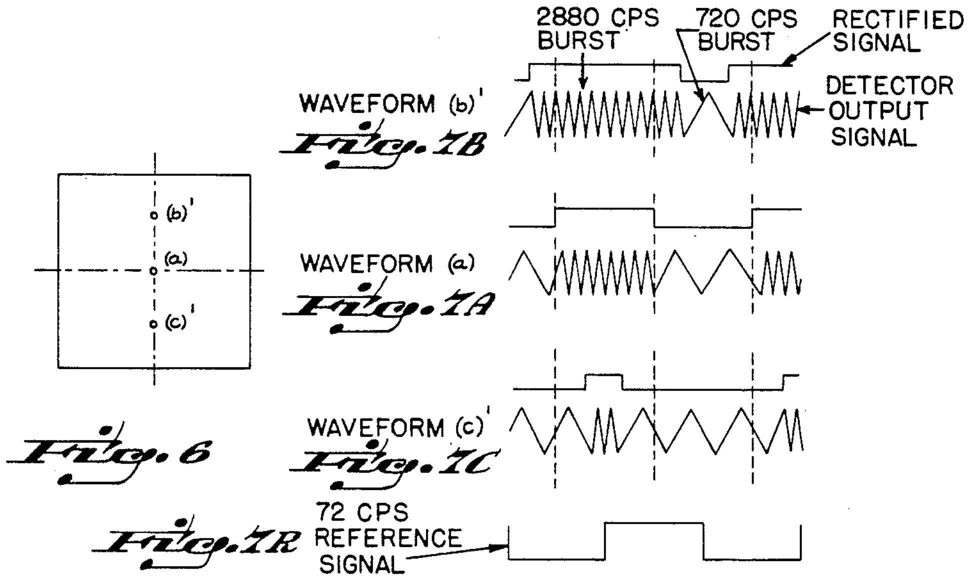
Figures 8, 9A, 9B, 9C, 9R:
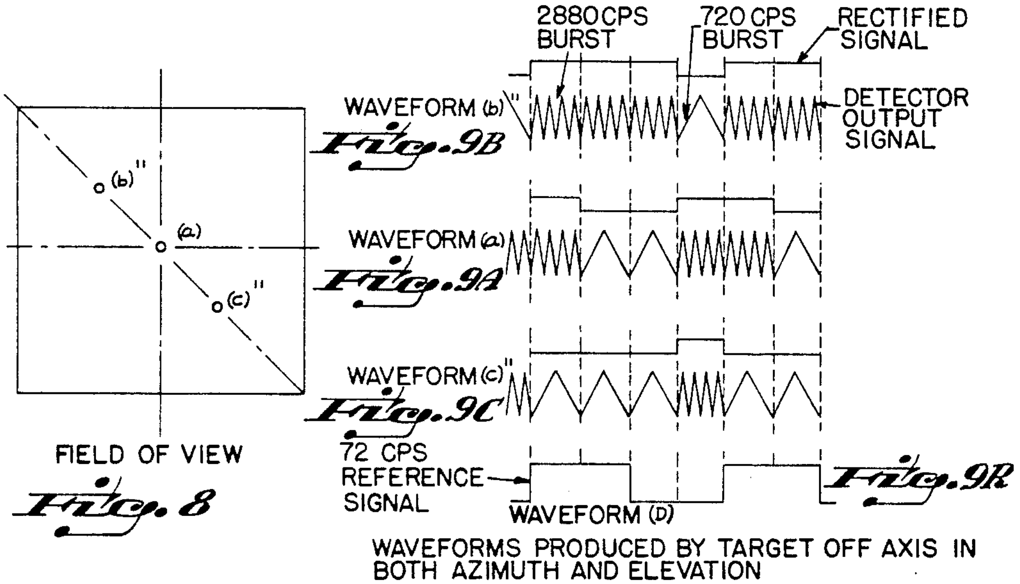
Figure 10A:
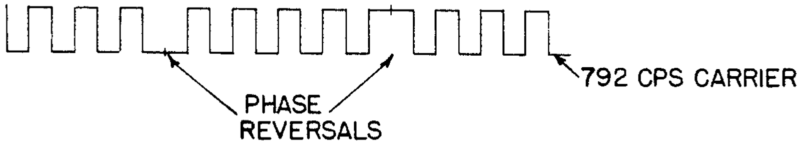
Figure 10B:
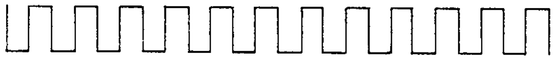
Figure 10C:
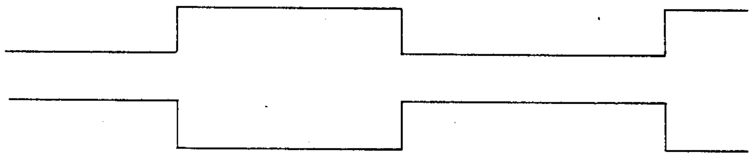

For a better understanding of the invention, together with other and further objects, advantages, and capabilities thereof, reference is made to the following description of the accompanying drawings, in which:

FIG. 1 is a plan view of a biphase reticle in accordance with the invention;

FIG. 2 is a block diagram of the system in accordance with the invention, for developing the requisite two-level waveform or envelope mentioned above, without ambiguity (it will, of course, be well understood by persons of ordinary skill in this art that the two-level envelope contains all of the requisite information, and such persons also are familiar with means and methods by which this envelope is utilized to produce the elevation and azimuth error signals);

FIGS. 3A and 3B are a perspective view and a fragmentary view, respectively, of a tracking unit and a reference signal generator as used in the invention, this unit being generally conventional except for the novel reticle and the addition of a second phase reference detector;

FIGS. 4, 6, and 8 are outlines of the field of view of the following hypothetical targets, respectively: *b*, *a*, and *c*, variously placed on the horizontal midline of the field of view; *b'*, *a*, and *c'*, all on the vertical midline; *a*, *b''*, and *c''*, the latter two being displaced from both midlines;

FIGS. 5B, 5A, 5C, 7B, 7A, 7C, 9B, 9A, and 9C are groups of prior art waveforms pertinent to these targets, respectively: *b*, *a*, *c*; *b'*, *a*, *c'*; *b''*, *a*, *c''*;

FIGS. 5R, 7R, and 9R show the 72 cycle-per-second reference waveform, in each instance in time relationship to the associated waveforms;

FIGS. 10A, 10B, and 10C show certain waveforms produced in accordance with the invention and hereinafter discussed; and FIG. 11 is a segment of a prior art dual-frequency reticle.

Referring now first to FIG. 1, there is shown an improved reticle 20 in accordance with the invention. It is rotatably mounted at 45 (FIG. 3A) for angular movement at constant speed, in accordance with prior art practice. Its active portion is formed as a circular band divided into alternating types of patterns. One type, 21, roughly triangular in shape, has its apex pointed radially inwardly. The other pattern, referred to by the reference numeral 22, more nearly resembles a lobe but may be referred to as a triangle with its apex extending radially outwardly. Each pattern consists of a plurality of blades or spokes providing uniformly spaced opaque portions and transparent portions. The longest blade of pattern 22 is substantially centrally located, and the blades on each side of it are progressively shorter. Similarly, the longest blade in pattern 21 is substantially centrally located, and the blades on each side of it are also progressively shorter. The number of blades (here shown as eleven—can be more or less) in pattern 21 is equal to the number of blades in pattern 22. Let the blades and the spaces between them be referred to as "spokes."

The curved lines such as 23, 24 terminating the spokes and defining the pattern, are provided per the invention and are called "coding curves." All spokes subtend the same angle, and they are either opaque or transparent to energy at the frequency of interest. In FIG. 1 the black spokes are opaque. Since the reticle 20 turns at a constant rate, the chopped signal due to a point target will have a constant frequency with periodic 180-degree phase reversals. The time of occurrence and the time separation of the phase reversals contain the information or data about the target position. The biphase reticle is characterized by the single-frequency, biphase signal it generates.

Referring now to FIG. 3A, the general configuration of the optics of the tracking system is there shown. Radiation received from a heat source, as limited to the short wave length infrared portion of the spectrum, is reflected onto a photo multiplier tube in a suitable data detector 40 by a suitable system comprising a lens 41 and a mask 42, formed with an opening 43, the path of the focused energy being as indicated at 44. The two-pattern reticle 20 in accordance with the invention is suitably mounted for rotation at 45 within an appropriate housing 46. The peripheral sectors such as 26, etc., in conjunction with a first reference detector 47, are utilized to generate a 72 cycle per second reference square wave signal, as shown in each of FIGS. 5R, 7R, and 9R. Except for the reticle, the FIG. 3A arrangement so far described is conventional.

In accordance with the invention an additional phase reference detector mechanically displaced from the first-mentioned phase reference detector and numbered 48 is provided so as to provide an electrical displacement of 90 degrees. A phase reference detector of the character illustrated at 47 is per se conventional, and it comprises a visible light source 49 (FIG. 3B) and a photoelectric signal generator 50 located on opposite sides of the reticle in such manner that the light path between the source and the cell is periodically interrupted by the peripheral blades such as 26 in order that the cell 19 may generate a square wave reference signal.

The reticle pattern chops the target radiation into alternate bursts of signals of the same frequency but of opposite phase. These signals are processed and demodulated in accordance with the invention, as will be shown hereinafter. Specifically, these bursts are converted into a series of two-level pulses. The position of these pulses along a time axis, as compared to the reference signal, indicates the azimuth error. The relative widths of the two portions of these pulses furnish data indicating the elevation error.

Referring further to the reticle of FIG. 1, it will be seen that there are six peripheral blades such as 25, 26, 27, 28, 29, and 30, utilized in the generation of the reference pulses. These blades are separated by spaces 31, 32, 33, 34, 35, and 36. These blades are alike and are equally spaced from each other, and are utilized to generate the reference pulses as shown in FIGS. 5R, 7R, and 9R. Now, it will be noted that there are also six of each of the patterns. The points of the lobe-like patterns are angularly aligned with corresponding edges of the peripheral blades.

When the opening of mask 42 is uniformly illuminated and no target is present, the transducer 40 output should be constant as the reticle turns if the contrast between target and background is to be maximized. This condition exists if half of the reticle area exposed by the mask is opaque, a requirement that can be satisfied in the derivation of the coding curve. In general reticle design, the contrast between target and background is enhanced by making the gap between blades equal to the diameter of the target image in the plane of the reticle. If the gap is too small, the transducer will never see the entire target, and the target signal size will be less than it could be. If the gap is too large, the target size will be maximum, but there will be no discrimination against non-targets slightly larger than the target. In a single-frequency reticle like that shown in FIG. 1, the designer has considerable freedom in selecting spoke width, so this reticle can be made compatible with targets of many sizes. The reticle is so designed as to provide known operating frequencies for the transducer and the associated electronics, to provide target position information, and to optimize the contrast between the signal due to the target and the signal due to the background. Many different reticle patterns may be used, depending on the particular application.

From the foregoing it will be seen that the single-frequency, biphase reticle in accordance with the invention has the following advantages: (1) lack of complexity in demodulating equipment; (2) improved sensitivity due to coherent detection; (3) continuous target position indication in space; (4) design easily adapted to specific target size; (5) excellent discrimination against uniform background; and (6) one-dimensional discrimination against energy sources larger than target of interest.

The incoming energy is chopped by reticle 20 so that the transducer output varies at 792 cycles per second, with periodic phase reversals at a 72 cycle-per-second rate. The time of occurrence and the time separation of the reversals contain the target information.

The 792 cycles per second signal generated by chopping beam 44 constitutes the output of the transducer 40. This is a single frequency signal, biphasal in nature. While it is a continuous wave signal, noise is present. Since it is of single frequency, filtering techniques cannot be used to convert the two types of bursts into a two-level square wave signal. In accordance with the invention, demodulation of this signal is accomplished by a synchronous detector. The expression "this signal" refers to the waveform shown in FIG. 10A. Now it is appreciated that a waveform of the type illustrated in FIG. 10B can be used in order to decommutate or to decommutate or to demodulate the FIG. 10A waveform. A comparison of the waveforms of FIGS. 10A and 10B reveals that, if differentially combined, certain portions will cancel each other out and other portions will reinforce each other to furnish intelligence. Therefore there is need to produce a demodulation signal as per FIG. 10B. Such a waveform could be produced by diverting part of the received energy from the heat source and passing it through an additional reticle, identical to the reticle of FIG. 1 but without the biphase characteristics. The output of such additional reticle would be a coherent reference as illustrated in FIG. 10B and such a reference could be used directly to demodulate the FIG. 10A waveform, as will be understood by those of ordinary skill in this art. The use of such a direct coherent reference is within the broad teachings of this invention, but it is preferred that a reference be developed from the transducer output signal itself through a novel usage of channel sync recovery techniques.

In accordance with this aspect of the invention, therefore, the demodulation signal is recovered from the transducer output in the manner now described. The biphase output from the transducer is applied to a first phase (FIG. 2) sensitive demodulator 50 in the principal signal channel. Now for purposes of sync recovery this output signal is also applied to a cascaded combination of a limiter 51, bandpass filter 52, and a squaring circuit 53. The squaring circuit output comprises a double frequency signal of 1,584 cycles per second, and this output is narrow-band filtered by the use of a phase lock loop. The phase lock loop comprises a loop phase detector 54, having an input coupled to the output of the squaring circuit 53, and the closed loop further comprises a filter circuit 55, an amplifier 56, and a voltage controlled oscillator 57 having an output coupled to another input of the loop phase detector 54. The output of the loop phase detector is a voltage proportional to the cosine of the difference in phase between the two sinusoidal waves applied to it from the elements 53 and 57, and, after filtering by filter 55 this voltage is amplified by 56 and applied to the oscillator 57 to control its frequency.

When this closed loop system is in equilibrium, the local oscillator frequency of element 57 is equal to twice the pulse repetition frequency of the transducer output signal and is in quadrature with the squaring circuit output. The output of the oscillator 57 is divided by two in a frequency divider 58 and is applied to the phase sensitive demodulator 50 in such a manner that signals of the waveform of FIG. 10B are in suitable time relationship to the transducer output signals of waveform per FIG. 10A. Parenthetically, it is also within the purview of the present invention to utilize an open loop method for processing the incoming transducer output signal in such manner as to generate clock pulses of the proper frequency and phase for synchronous operation of the coherent demodulator 50. The advantage of the closed loop configuration is that it maintains synchronism in more adverse reception conditions.

The output of the phase sensitive demodulator 50 is a two-level waveform (per the top wave of FIGS. 5A, 5B, 5C, 6A, etc.) in which level changes correspond to phase changes in the transducer output. From this two-level waveform there are derived the elevation and azimuth error signals in the same manner as in the prior art tracker, and such derivation, being known to the art, will therefore not be described herein.

There is no phase sense in the signal appearing on line 59 because it was destroyed in the process of squaring. For this reason there is an inherent ambiguity in the polarity of the demodulated signal output of phase detector 50. It is necessary to eliminate this ambiguity because the phase of the demodulated signal contains required tracking data. Stating this dilemma another way, the output of the phase sensitive demodulator 50 may consist of either of the waveforms shown in FIG. 10C and yet only one of these waveforms is indicative of the target and is appropriate.

It is necessary to select one of these waveforms and in accordance with the invention means for doing so is provided.

Parenthetically, a process of channel synchronization per se, including closed loop and open loop circuit filter techniques, is described at pages 110–113 of "Aerospace Telemetry," Stiltz, Prentice-Hall, Inc., Englewood Cliffs, N.J., 1961, and a phase locked loop is described at pages 240–241 and 264–265 of the same text.

It is within the competence of one of ordinary skill in the art, with this disclosure before him, to apply the video output of the FIG. 2, system, the production of which the invention discloses, and the 72 cycle-per-second azimuth reference from detector 47 to an additional phase demodulating device (not shown) in order to derive the azimuth error signal.

It has been demonstrated that the requisite waveform of FIG. 10C is produced by that portion of the invention so far described, when the squaring technique of the preferred embodiment is used. Now, in order to resolve the ambiguity mentioned above, there is provided the additional reference detector 48 of FIG. 3A, which generates another reference signal, similar to that generated by detector 47, and which produces an output on line 60 in quadrature to the principal 72 cycle-per-second azimuth reference signal. Since the primary reference signal (FIG. 5R) is aligned in quadrature with the demodulated signal (FIG. 5B) for an on-axis target, the output of 48—i.e., the secondary reference output—should be in phase for an on-axis target (and within ±90 degrees for an off-axis target) with the output on line 66, and accordingly the output of 50 is applied by line 61 to the input of a phase detector 62, to which the secondary reference is also applied. A polarity-sensing device 64 is coupled to the phase detector 62, and the output of the polarity-sensing device 64 is coupled to a polarity reversing switch or inverting circuit 65 at the output of demodulator 50. The elements 64 and 65 are essentially a binary device which responds to phase detector 62 to invert the output of demodulator 50 if that output is not substantially in phase as opposed to being substantially 180 degrees out of phase with the secondary reference. On the other hand, if that output is substantially in phase with the secondary reference, then the phase detector 62 does not actuate the popolarity-sensing device 64, and it in turn does not actuate the inverting switch 65.

The reticle 20 is masked to provide a maximum phase shift of plus or minus 90 degrees between the output of demodulator 50 and the secondary reference for any target within the field of view. This provision permits operation of the elements 62, 64, 65 for an on-off target.

The output of phase detector 62 is so arranged as to be positive when the phase comparison is satisfied, and negative when the phase comparison is not satisfactory. Thus it will be seen that the inversion switch 65 causes to be selected that one of the waveforms of FIG. 10C which bears the proper phase relationship to the secondary reference pulses appearing on line 60.

From the foregoing it will be seen that the provision of the identified one of the waveforms of FIG. 10C has been accomplished, and therefore the invention serves the objects stated above. As to the means by which the properly identified two-level waveform is employed to generate azimuth and elevation error signals, reference is simply made to the prior art.

To compare the operation of the present invention with the prior art, let us consider FIG. 4 and the various waveforms of FIGS. 5A, 5B, 5C, and 5R, using a prior art reticle of the two-frequency type as per FIG. 11. In the case of target *a* of FIG. 4, which is on center horizontally, the time of transition between the two frequencies (from high to low) occurs at a certain point (FIG. 5A) with reference to the reference pulse of FIG. 5R. In the case of a nine o'clock target *b*, this time or phase displacement is delayed per FIG. 5B. In the case of a three o'clock target *c*, this time is advanced (per FIG. 5C), and therefore the phase relationship of the transition relative to the reference pulse provides the information which determines the target position in azimuth.

Now considering FIG. 6 and the several waveforms of FIGS. 7A, 7B, 7C, and 7R, it will be noted that the durations of the low frequency and the high frequency pulses are approximately the same, per FIG. 7A for a centered target *a*. In the case of a twelve o'clock target, with vertical elevation, the duration of the low frequency bursts is decreased and that of the high frequency bursts is increased, per curve 7B. In the case of a depressed target, the duration of the low frequency bursts is increased and that of the high frequency bursts is decreased, per curve 7C.

It will be understood from the foregoing that the necessary intelligence for indicating the elevation of a target is provided by pulse width demodulation, and the intelligence for indicating the azimuth of a target is obtained by processes of pulse position demodulation.

The operation of the invention is quite similar to that illustrated in FIGS. 5A through 9R, except that in lieu of frequency changes there are 180 degree phase changes. While the upper waveforms in the various figures are labeled "Rectified Signal" and such waveforms are produced by frequency separation and rectification in the prior art, the corresponding waveforms of the present invention are those appearing at the output of FIG. 2 marked "Video Output."

Again, FIGS. 8 and 9A, 9B, 9C, and 9R refer to the prior art, and they show the waveforms produced by targets which are off the reference axis in both azimuth and elevation, except for FIG. 9A, which shows a centered target. These curves are self-explanatory. Again, in practicing the invention, a single-frequency biphasal signal is utilized in lieu of two frequencies, and significance is derived from the change of phase and not from a change of frequency.

While there has been shown and described what is at present considered to be the preferred embodiment of the invention, it will be understood by those skilled in the art that various modifications and changes may be made therein without departing from the scope of the invention as defined by the appended claims.

We claim:

1. In a device for tracking targets of radiant energy emitted from a target the combination of:

an infrared radiation detector, an optical system for impinging on said detector a beam of radition from an object within a field of vision;

a reticle for chopping said beam, said reticle being formed to modulate on said beam biphase data bursts characterized by a signal frequency high with respect to the rate of phase reversal;

means including a first phase reference detector in combination with spaced formations on said recticle for modulating reference signals on said beam, the relative widths of the data burst outputs of said infrared detector being indicative of the elevation of the target and the positional relationships of the phase reversals to the reference signals being indicative of the azimuth of said target, synchronized demodulating means for converting said data burst outputs into two-level wave forms from which target azimuth and elevation data may be derived, synchronizing means coupled to the demodulating means and including means for providing the second harmonic of the reference signals, whereby the polarity of the two-level wave forms is ambiguous, and means for resolving said ambuity comprising:

- a second phase reference detector which is space-displaced from the first phase reference detector,
- means for sensing whether the outputs of the demodulating means and the second phase reference detector are substantially in phase, and
- means responsive to a negative answer for reversing the polarity of the output of the demodulating means said reticle comprising:

- a circular arrangement of angularly spaced radially extending intercepting spokes formed in alternate patterns, with the same plural number of spokes in each pattern,
- one of said patterns being generally lobar in form with apex directed outwardly toward the periphery,
- the other of said patterns being generally triangular with apex directed radially inwardly,
- the spokes being of the same proportions and shape but of varying lengths as defined by phase shift lines separating the patterns,
- whereby the spokes chop the beam of radiation alternately into waves of one phase and waves of the opposite phase.

2. In a device for tracking targets by radiant energy emitted from a target the combination of:

an infrared radiation detector, an optical system for impinging on said detector a beam of radiation from an object within a field of vision;

a recticle for chopping said beam, said recticle being formed to modulate on said beam biphase data bursts characterized by a signal frequency high with respect to the rate of phase reversal;

means including a first phase reference detector in combination with spaced formations on said reticle for modulating reference signals on said beam, the relative widths of the data burst outputs of said infrared detcetor being indicative of the elevation of the target and the positional relationships of the phase reversals to the reference signals being indicative of the azimuth of said target, synchronized demodulating means for converting said data burst outputs into two-level wave forms from which target azimuth and elevation data may be derived, synchronizing means coupled to the demodulating means and including means for providing the second harmonic of the reference signals, whereby the polarity of the two-level wave forms is ambiguous, and means for resolving said ambiguity said reticle comprising:

a circular arrangement of angularly spaced radially extending intercepting spokes formed in alternate patterns, with the same plural number of spokes in each pattern, one of said patterns being generally lobar in form with apex directed outwardly toward the periphery, the other of said patterns being generally triangular with apex directed radially inwardly, the spokes being of the same proportions and shape but of varying lengths as defined by phase shift lines separating the patterns, whereby the spokes chop the beam of radiation alternately into waves of one phase and waves of the opposite phase.

References Cited

UNITED STATES PATENTS 3,007,053 10/1961 Merlen ------------ 250—203

ROBERT SEGAL, *Primary Examiner.*